(12) United States Patent
Kokubo et al.

(10) Patent No.: US 11,877,104 B2
(45) Date of Patent: Jan. 16, 2024

(54) DISPLAY METHOD

(71) Applicant: SEIKO EPSON CORPORATION, Tokyo (JP)

(72) Inventors: Koya Kokubo, Matsumoto (JP); Soma Yamada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/881,805

(22) Filed: Aug. 5, 2022

(65) Prior Publication Data

US 2023/0038104 A1    Feb. 9, 2023

(30) Foreign Application Priority Data

Aug. 6, 2021   (JP) .................... 2021-129620

(51) Int. Cl.
*G03B 21/14* (2006.01)
*H04N 9/31* (2006.01)

(52) U.S. Cl.
CPC ......... *H04N 9/3194* (2013.01); *H04N 9/3147* (2013.01)

(58) Field of Classification Search
CPC .... G03B 21/147; G03B 21/14; H04N 9/3179; H04N 9/3188; H04N 9/3194
See application file for complete search history.

(56) References Cited

U.S. PATENT DOCUMENTS

2017/0352248 A1   12/2017   Shimizu et al.
2019/0253679 A1    8/2019   Tsubota et al.
2022/0121317 A1*   4/2022   Yokoyama ............ G06F 3/0482

FOREIGN PATENT DOCUMENTS

| JP | 2002-162690 A | 6/2002 |
| JP | 2014-010362 A | 1/2014 |
| JP | 2019-109273 A | 7/2019 |
| JP | 2019-139030 A | 8/2019 |
| JP | 2019-139069 A | 8/2019 |
| JP | 2020-021080 A | 2/2020 |
| JP | 2020-178248 A | 10/2020 |

OTHER PUBLICATIONS

Exterior view of EB-L255F with Ceiling mount ELPMB60W.B_Epson Sales Japan Corporation_2020722.
Exterior view of EB-L255F with Lighting Track Mount ELPMB61W.B_Epson Sales Japan Corporation_20200722.

* cited by examiner

*Primary Examiner* — Ryan D Howard
(74) *Attorney, Agent, or Firm* — Dority & Manning, P.A.

(57) ABSTRACT

A display method includes projecting, by a projector on a first projection surface located at a first distance from the projector, a first image which represents a size of a second image to be projected on a second projection surface by the projector, the second projection surface being located at a second distance, different from the first distance, from the projector.

9 Claims, 11 Drawing Sheets

FIG. 8
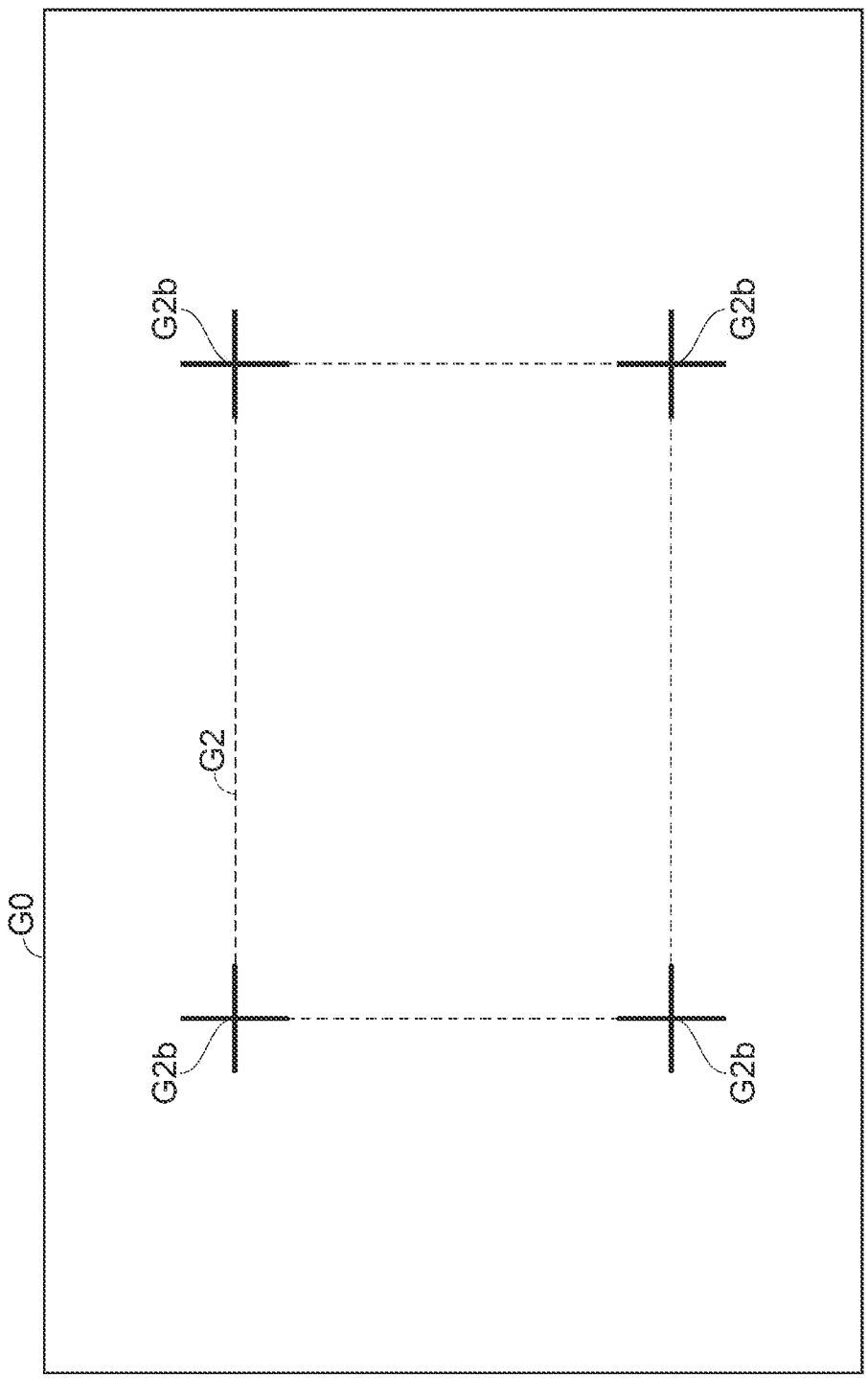
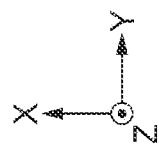

DISPLAY METHOD

The present application is based on, and claims priority from JP Application Serial Number 2021-129620, filed Aug. 6, 2021, the disclosure of which is hereby incorporated by reference herein in its entirety.

BACKGROUND

1. Technical Field

The present disclosure relates to a display method.

2. Related Art

There has been known a technology of displaying a guide window for a screen on a picture plane. A remote controller device in JP-A-2002-162690 is provided with a guide window projection mechanism. The guide window projection mechanism projects the guide window equivalent in screen size to the screen to be projected by the projector main body on the picture plane.

When installing the projector, a projection surface such as a screen is not prepared in some cases. In this case, the installation operator is required to perform a position adjustment and so on of the projector using a replacement screen or the like. However, a distance between the projector and the projection surface on which projection is actually performed is unclear for the installation operator, and thus, it is difficult for the installation operator to figure out the size of the projection image.

SUMMARY

A display method according to the present disclosure includes projecting, when a projector projects a first image on a first projection surface located at a first distance from the projector, the first image on the first projection surface, wherein the first image represents a size of a second image to be projected on a second projection surface located at a second distance, different from the first distance, from the projector.

BRIEF DESCRIPTION OF THE DRAWINGS

FIG. 8 is a diagram showing a projection image indicating an estimated projection range.

DESCRIPTION OF AN EXEMPLARY EMBODIMENT

1. Configuration of Projector 1

Figure 1:
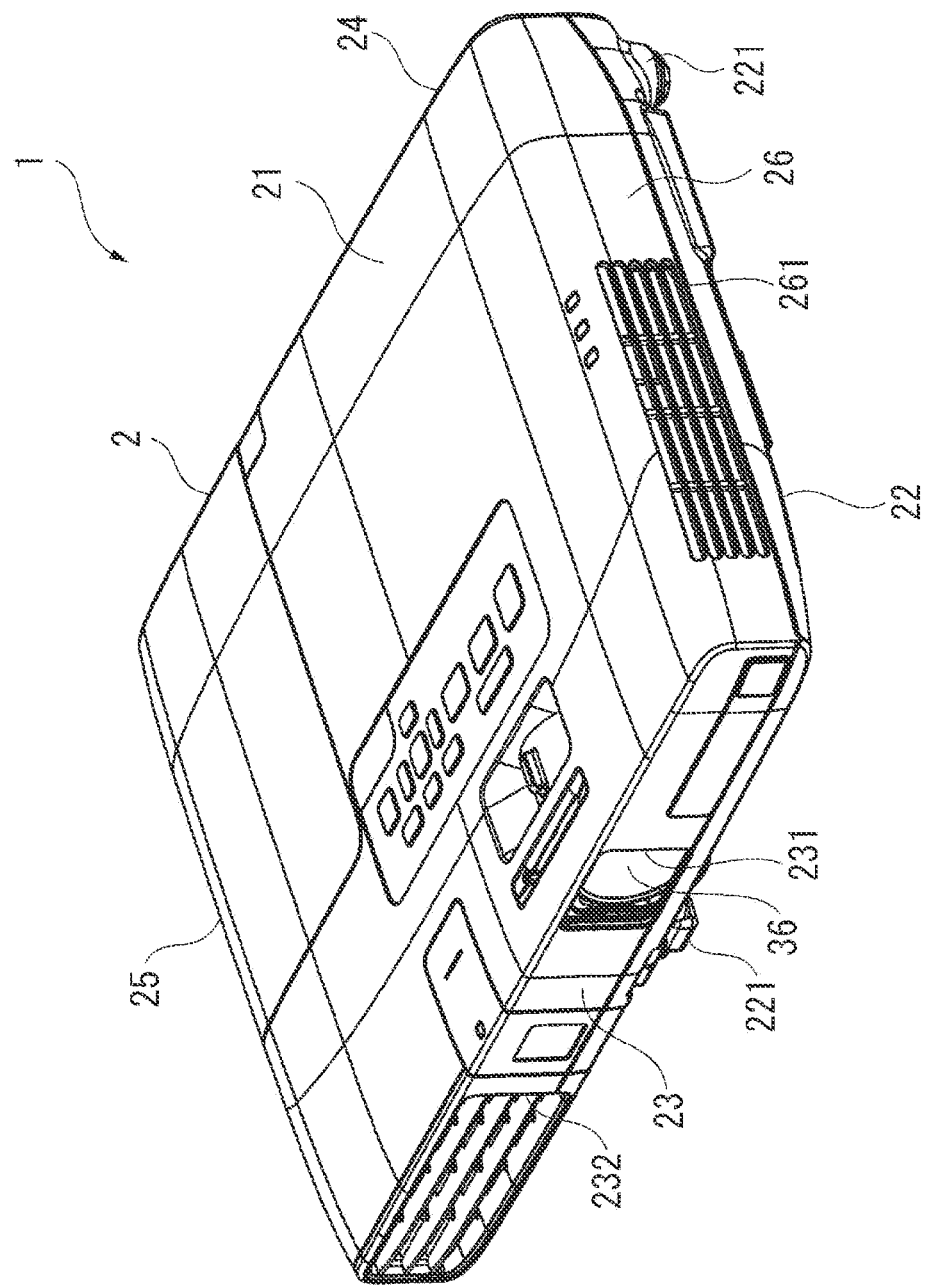
FIG. 1 is a perspective view showing an external appearance of a projector.
Figure 2:
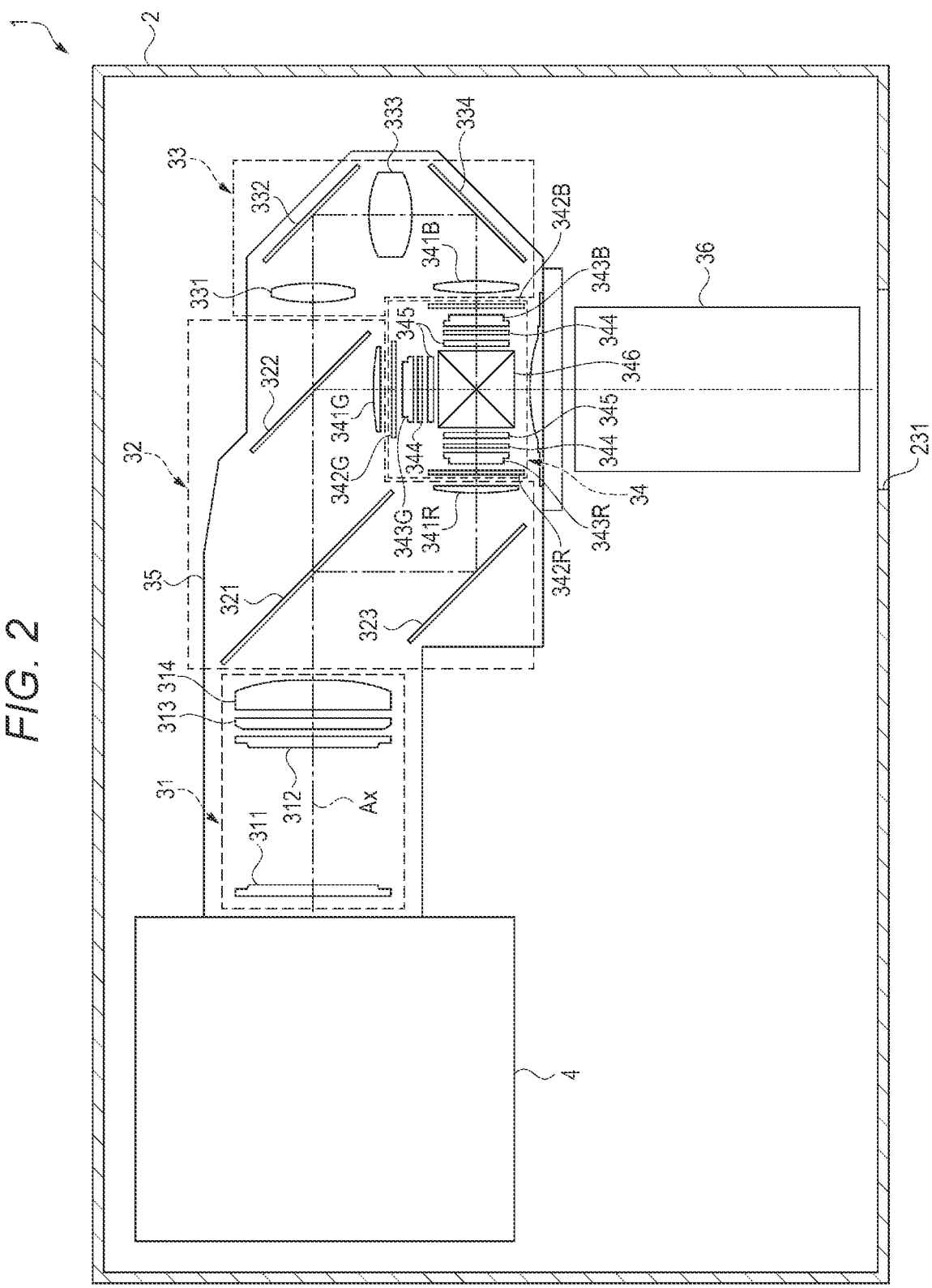
FIG. 2 is a schematic diagram showing an internal configuration of the projector.

The present embodiment illustrates a projector 1 provided with three light modulation devices as a projection-type display device. FIG. 1 is a perspective view showing an external appearance of the projector 1 as the projection-type display device. FIG. 2 is a schematic diagram showing an internal configuration of the projector 1.

The projector 1 modulates the light emitted from a light source device 4 described later to thereby form an image corresponding to image information. The projector 1 is an image display device of a projection type which projects the image thus formed in an enlarged manner on the projection surface such as a screen.

As shown in FIG. 1, the projector 1 is provided with an exterior housing 2 constituting the exterior. The exterior housing 2 is shaped like a substantially rectangular solid, and has a top surface 21, a bottom surface 22, a front surface 23, a back surface 24, a left side surface 25, and a right side surface 26.

The bottom surface 22 has a plurality of legs 221 and an attachment not shown. The attachment is coupled to a ceiling mount device 100 described later. The front surface 23 is a housing region located at a projection side of the image. The front surface 23 has an opening 231 for exposing a part of a projection optical device 36. The image is projected from the projection optical device 36 through the opening 231. The front surface 23 is provided with an exhaust port 232. From the exhaust port 232, there is discharged a cooling gas having cooled a cooling target located inside the projector 1 to an outside of the exterior housing 2. The right side surface 26 is provided with an introduction port 261. From the introduction port 261, there is introduced a gas such as air located outside the exterior housing 2 as the cooling gas to an inside of the exterior housing 2.

As shown in FIG. 2, the projector 1 is provided with the light source device 4, a homogenizing device 31, a color separation device 32, a relay device 33, an image forming device 34, an optical housing 35, and the projection optical device 36 inside the exterior housing 2. The light source device 4 emits illumination light. A configuration of the light source device 4 will be described later. It should be noted that in FIG. 2, the illustration of the exhaust port 232, the introduction port 261, and so on described above is omitted. Further, although not shown in the drawings, the projector 1 is provided with a control device for controlling an operation of the projector 1, a power supply device for supplying electronic components of the projector 1 with electrical power, and a cooling device for cooling the light source device 4 and so on.

In a proceeding direction of the illumination light emitted from the light source device 4, there is disposed the homogenizing device 31. The illumination light emitted from the light source device 4 enters the homogenizing device 31. The homogenizing device 31 is provided with a first multi-lens array 311, a second multi-lens array 312, a polarization conversion element 313, and a superimposing lens 314. These constituents are arranged toward the proceeding direction of the illumination light emitted from the light source device 4 in the order described above. The homogenizing device 31 homogenizes the illumination light emitted from the light source device 4. The illumination light thus homogenized is emitted from the homogenizing device 31.

In the proceeding direction of the illumination light emitted from the homogenization device 31, there is disposed the color separation device 32. The illumination light emitted from the homogenizing device 31 enters the color separation device 32. The color separation device 32 is provided with a first dichroic mirror 321 as a first color separation element, a second dichroic mirror 322 as a second color separation element, a reflecting mirror 323 as a mirror, a first field lens 341R, and a second field lens 341G.

The color separation device 32 separates the light having entered the color separation device 32 from the homogenizing device 31 into colored light beams. The illumination light having entered the color separation device 32 reaches the first dichroic mirror 321. The first dichroic mirror 321 is arranged adjacent to the superimposing lens 314 of the homogenizing device 31.

The first dichroic mirror 321 reflects first light belonging to a first wavelength band included in the illumination light emitted from the homogenizing device 31 toward the reflecting mirror 323, and transmits light in a wavelength band other than the first wavelength band. The first wavelength band is, for example, a wavelength band as a red light region, and the wavelength band other than the first wavelength band is a wavelength band as a green light region and a blue light region. The wavelength band as the red light region is not particularly limited, but is a range from about 610 nm to 750 nm. The wavelength band as the blue light region is not particularly limited, but is a range from about 430 nm to 495 nm. The wavelength band as the green light region is not particularly limited, but is a range from about 495 nm to 570 nm.

The first light is, for example, red light, and light in the wavelength band other than the first wavelength band corresponds to green light and blue light. Here, the red light is light of a substantially red color, the green light is light of a substantially green color, and the blue light is light of a substantially blue color. The first wavelength band is not limited to the red light region, and can be the green light region or the blue light region, and the first light can be the green light or the blue light.

In the proceeding direction of the red light as the first light having been reflected by the first dichroic mirror 321, there is arranged the reflecting mirror 323. The red light having been reflected by the first dichroic mirror 321 is reflected by the reflecting mirror 323 toward the first field lens 341R. The first field lens 341R collects the red light which has entered the first field lens 341R, and then emits the result toward a first incident side polarization plate 342R of the image forming device 34.

In the proceeding direction of the green light and the blue light having been transmitted through the first dichroic mirror 321, there is arranged the second dichroic mirror 322. The second dichroic mirror 322 reflects second light belonging to a second wavelength band out of the green light described above and the blue light described above, and transmits third light belonging to a wavelength band other than the second wavelength band. The second wavelength band is, for example, a green light region. The second light is the green light, and the third light is the blue light. It should be noted that the second wavelength band is not limited to the green light region, and can be the blue light region. The second light can be the blue light, and the third light can be the green light.

In the proceeding direction of the green light as the second light having been reflected by the second dichroic mirror 322, there is arranged the second field lens 341G. The second field lens 341G collects the green light which has entered the second field lens 341G, and then emits the result toward a second incident side polarization plate 342G of the image forming device 34.

In the proceeding direction of the blue light as the third light having been transmitted through the second dichroic mirror 322, there is arranged the relay device 33. The blue light enters the relay device 33. The relay device 33 is provided with an incidence side lens 331, a first reflecting mirror 332, a relay lens 333, a second reflecting mirror 334, and an exit side lens 341B as a third field lens.

The blue light becomes longer in light path compared to the red light and the green light, and is therefore apt to become large in light flux. Therefore, by using the relay lens 333, the light flux is prevented from expanding. The blue light having entered the relay device 33 is converged by the incident side lens 331, then reflected by the first reflecting mirror 332, and then converged in the vicinity of the relay lens 333. The blue light having entered the relay lens 333 is diffused toward the second reflecting mirror 334 and the exit side lens 341B.

The second reflecting mirror 334 reflects the blue light emitted from the relay lens 333 to make the blue light enter the exit side lens 341B. The exit side lens 341B collects the blue light which has entered the exit side lens 341B, and then emits the result toward a third incident side polarization plate 342B of the image forming device 34.

The first dichroic mirror 321 and the second dichroic mirror 322 described above are manufactured by forming dielectric multilayer films corresponding respectively to the functions on a transparent glass plate.

The image forming device 34 is provided with three incident side polarization plates, three light modulation devices, three view angle compensation plates 344, three exit side polarization plates 345, and a color combining device 346. The three light modulation devices are a first light modulation device 343R, a second light modulation device 343G, and a third light modulation device 343B. The first light modulation device 343R modulates the red light as the first light. The second light modulation device 343G modulates the green light as the second light. The third light modulation device 343B modulates the blue light as the third light. The color combining device 346 is a color combining element, and combines the modulated light beams of the colors of red, green, and blue respectively modulated by the three light modulation devices.

The three light modulation devices each modulate the light emitted from the light source device 4 in accordance with the image information. In the present embodiment, as the three light modulation devices, there are adopted transmissive liquid crystal panels. The liquid crystal light valve is formed of the three incident side polarization plates, the three light modulation devices, and the exit side polarization plates 345. It should be noted that the light modulation devices are not limited to the transmissive liquid crystal panels, but can also be reflective liquid crystal panels or the like. Further, as the image forming device 34, there can be adopted a system using DMD (Digital Micromirror Device) as the light modulation device, a system having a single liquid crystal panel or a single DMD and a color wheel combined with each other, and so on.

The color combining device 346 combines the modulated light beams respectively modulated by the three light modulation devices with each other to form the image, and then makes the image enter the projection optical device 36. In the present embodiment, there is used a cross dichroic prism as the color combining device 346, but this is not a limitation. The color combining device 346 can be, for example, a configuration formed of a plurality of dichroic mirrors.

The optical housing 35 houses the homogenizing deice 31, the color separation device 32, the relay deice 33, and the image forming device 34 inside. It should be noted that in the projector 1, there is set an illumination light axis Ax as an optical axis of the homogenizing device 31. The optical housing 35 holds the homogenizing deice 31, the color separation device 32, the relay deice 33, and the image forming device 34 at predetermined positions on the illumination light axis Ax. The light source device 4 and the projection optical device 36 are also disposed at predetermined positions on the illumination light axis Ax.

The projection optical device 36 projects the image having entered the projection optical device 36 from the image forming device 34 on the projection target surface not shown in an enlarged manner. The projection optical device 36 projects the modulated light beams respectively modulated by the first light modulation device 343R, the second light modulation device 343G, and the third light modulation device 343B. The projection optical device 36 is formed of a combination lens having, for example, a plurality of lenses housed in a lens tube having a cylindrical shape.

Figure 3:
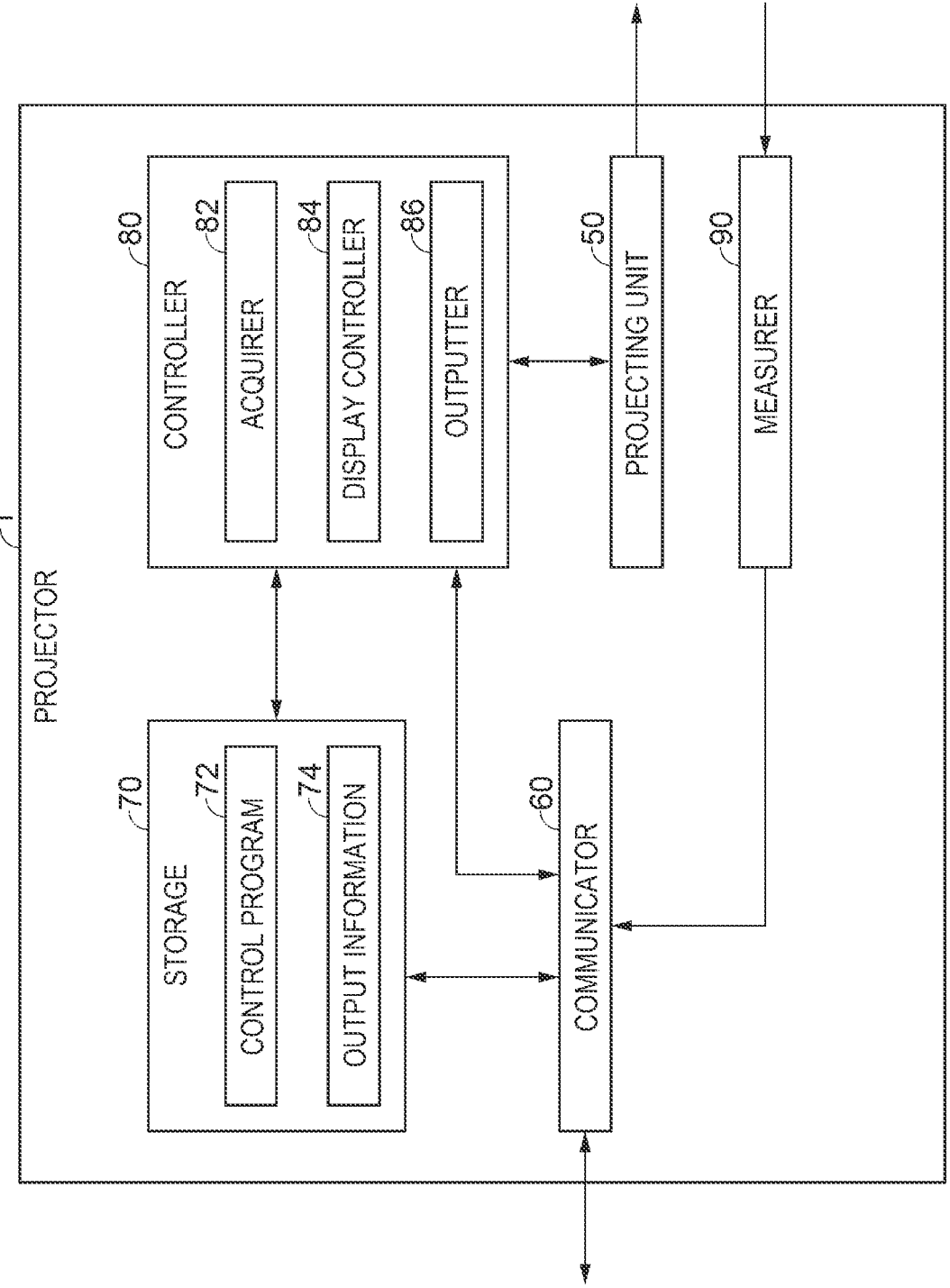
FIG. 3 is a block diagram showing functional blocks of the projector.

FIG. 3 shows functional blocks of the projector 1. The projector 1 is provided with a projecting unit 50, a communicator 60, a storage 70, a controller 80, and a measurer 90.

The projecting unit 50 projects the image on the projection surface. The projecting unit 50 corresponds to the light source device 4, the homogenizing device 31, the color separation device 32, the relay device 33, the image forming device 34, and the projection optical device 36 in FIG. 2.

The communicator 60 is a communication interface having a connector and an interface circuit. The communicator 60 is an operator for transmitting or receiving a variety of types of information from an external device, the measurer described later, and so on. The communicator 60 has a USB (Universal Serial Bus) terminal and a wired LAN (Local Area Network) terminal. It is possible for the communicator 60 to have a wireless communication board such as a Wi-Fi wireless communication board or a Bluetooth communication board to perform wireless communication with the external device. Here, USB, Wi-Fi, and Bluetooth are registered trademarks.

The storage 70 is a memory such as a RAM (Random Access Memory) and a ROM (Read Only Memory). The storage 70 stores a control program 72 and output information 74. The control program 72 is a program for controlling the projector 1. The output information 74 includes the image information to be projected by the projecting unit 50.

The controller 80 is a controller for controlling the projector 1. The controller 80 is provided with a single CPU (Central Processing Unit) or a plurality of CPUs. The controller 80 can be provided with a programmable logic device such as an FPGA (Field-Programmable Gate Array). The controller 80 executes the control program 72 stored in the storage 70 to thereby function as an acquirer 82, a display controller 84, and an outputter 86.

The acquirer 82 obtains information received by the communicator 60. The acquirer 82 obtains measurement data measured by the measurer 90 described later and data received from the external device via the communicator 60. The measurement data obtained by the acquirer 82 and the data received by the acquirer 82 are output to the display controller 84.

The display controller 84 generates the image to be projected by the projecting unit 50. The display controller 84 generates the image based on the output information 74 stored in the storage 70. The display controller 84 adjusts the output information 74 using the measurement data obtained by the acquirer 82 and the data received by the acquirer 82 to thereby generate the image data.

The outputter 86 outputs the image data generated by the display controller 84 to the projecting unit 50. The outputter 86 makes the projecting unit 50 project the image.

The measurer 90 measures a distance between the projector 1 and a floor surface PS1 described later. Further, the measurer 90 measures a distance between the projector 1 and an upper surface PS2 of a desk 500 described later. The measurer 90 is a range sensor or a depth sensor. The range sensor is, for example, a light reflective distance sensor having a light source for emitting light, and a light receiver for receiving the light reflected by a measurement object. The light source is an LED (Light Emitting Diode), a laser diode, or the like. The range sensor is not limited to the type using light, and can be a type using an electric wave, or a type using an ultrasonic wave. The depth sensor measures a distance to the measurement object with the time from when irradiating the measurement object with, for example, a laser beam to when the laser beam reflected by the measurement object reaches the depth sensor. The measurer 90 can be an imaging camera or the like. Although the projector 1 incorporates the measurer 90 in FIG. 3, this is not a limitation. The measurer 90 can be an external sensor to be coupled to the communicator 60.

2. Configuration of Ceiling Mount Device 100

Figure 4:
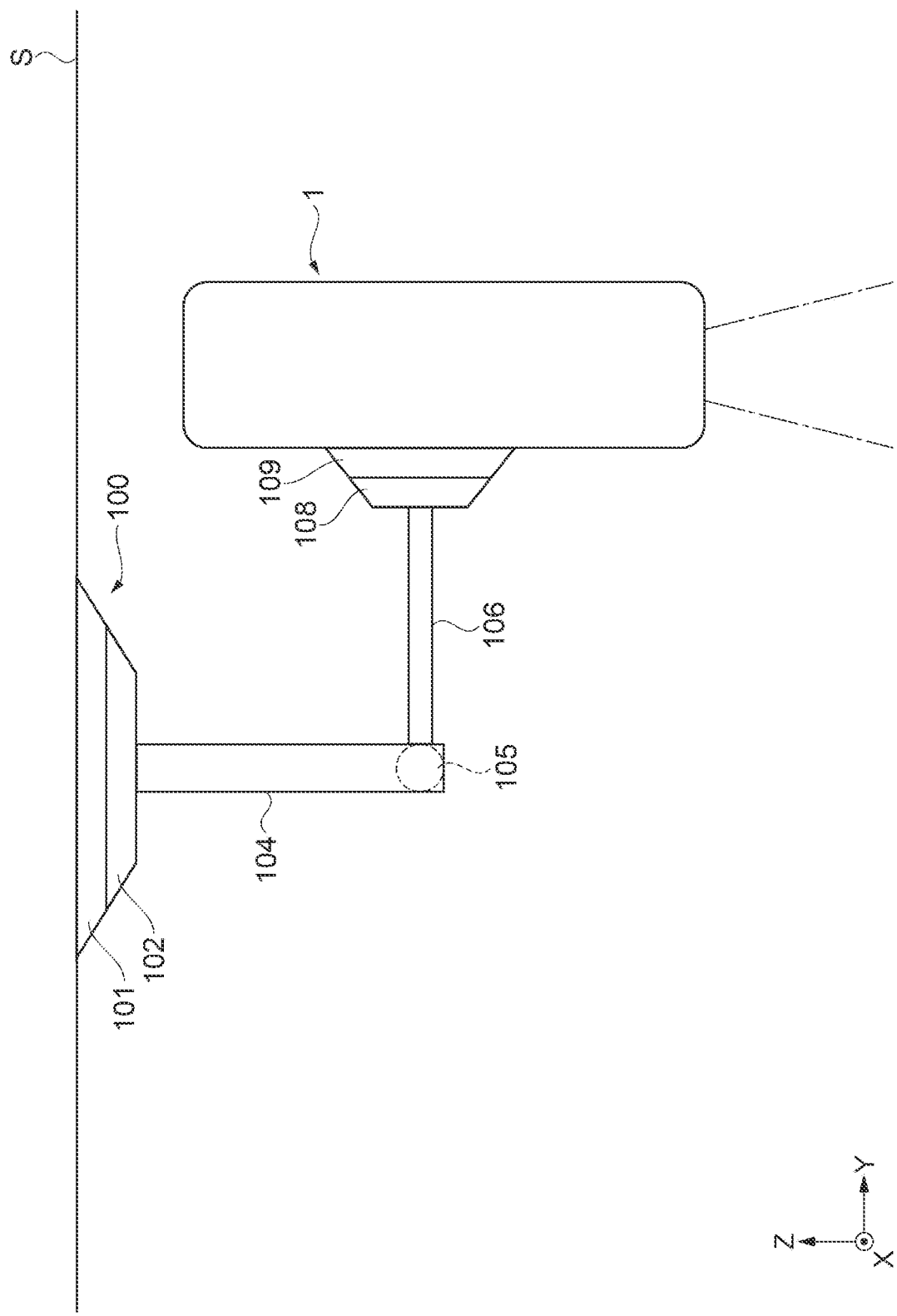
FIG. 4 is a diagram showing a configuration of a ceiling-mount device.

The projector 1 can be coupled to the ceiling mount device 100 with an attachment not shown provided to the bottom surface 22. The projector 1 is attached to the ceiling mount device 100 by an installation operator M. FIG. 4 shows a schematic configuration of the ceiling mount device 100. FIG. 4 shows a state in which the ceiling mount device 100 is attached to an attachment surface S. The ceiling mount device 100 is attached to the attachment surface S by the installation operator M. The attachment surface S shown in FIG. 4 is, for example, a ceiling. FIG. 4 shows an XYZ coordinate system. An X axis, a Y axis, and a Z axis are perpendicular to each other. The X axis is parallel to the attachment surface S, and corresponds to a depth of FIG. 4. The Y axis is parallel to the attachment surface S, and corresponds to a right side and a left side in FIG. 4. The Z axis is perpendicular to the attachment surface S.

The ceiling mount device 100 is provided with a fixation plate 101, a first support plate 102, a first support pipe 104, a joint 105, a second support pipe 106, a second support plate 108, and an attachment plate 109.

The fixation plate 101 is fixed to the attachment surface S with screws not shown. By the fixation plate 101 being attached to the attachment surface S, an approximate position where the projector 1 is installed is fixed.

The first support plate 102 is attached to the fixation plate 101. The first support plate 102 is movably supported with respect to the fixation plate 101. The first support plate 102 is movable along an axis parallel to the X axis, and an axis parallel to the Y axis. It is possible for the installation operator M to adjust the attachment position of the projector 1 by moving the first support plate 102 with respect to the fixation plate 101.

The first support pipe 104 is rotatably supported by the first support plate 102. The first support pipe 104 is rotatable around a rotational axis parallel to the Z axis. The first support pipe 104 can be provided with a cable hole through which a power supply cable, a LAN cable, and so on are inserted.

The joint 105 joins the first support pipe 104 and the second support pipe 106 to each other. The joint 105 allows the second support pipe 106 to rotate around a rotational axis parallel to the X axis.

The second support pipe 106 is supported by the first support pipe 104 via the joint 105. The second support pipe 106 rotates around a rotational axis parallel to the X axis to thereby change the posture of the projector 1. The second support pipe 106 can be provided with a cable hole through which the power supply cable, the LAN cable, and so on are inserted.

The second support plate 108 is supported by the second support pipe 106. The second support plate 108 movably supports the attachment plate 109. The second support plate 108 can be provided with an opening through which the power supply cable, the LAN cable, and so on are inserted.

The attachment plate 109 supports the projector 1. The attachment plate 109 is provided with screw holes not shown. By the installation operator M fixing screws through the screw holes to the attachment provided to the bottom surface 22, the projector 1 is attached to the attachment plate 109. The attachment of the projector 1 is not limited to the screws. It is possible for the installation operator M to attach the projector 1 by engaging an engagement such as a hook provided to the attachment plate 109 with the attachment of the bottom surface 22. The attachment plate 109 can move along an axis parallel to the X axis and an axis parallel to the Z axis with respect to the second support plate 108. It is possible for the installation operator M to adjust the attachment position of the projector 1 by moving the attachment plate 109 with respect to the second support plate 108.

3. Method of Installing Projector 1 According to First Embodiment

Figure 5:
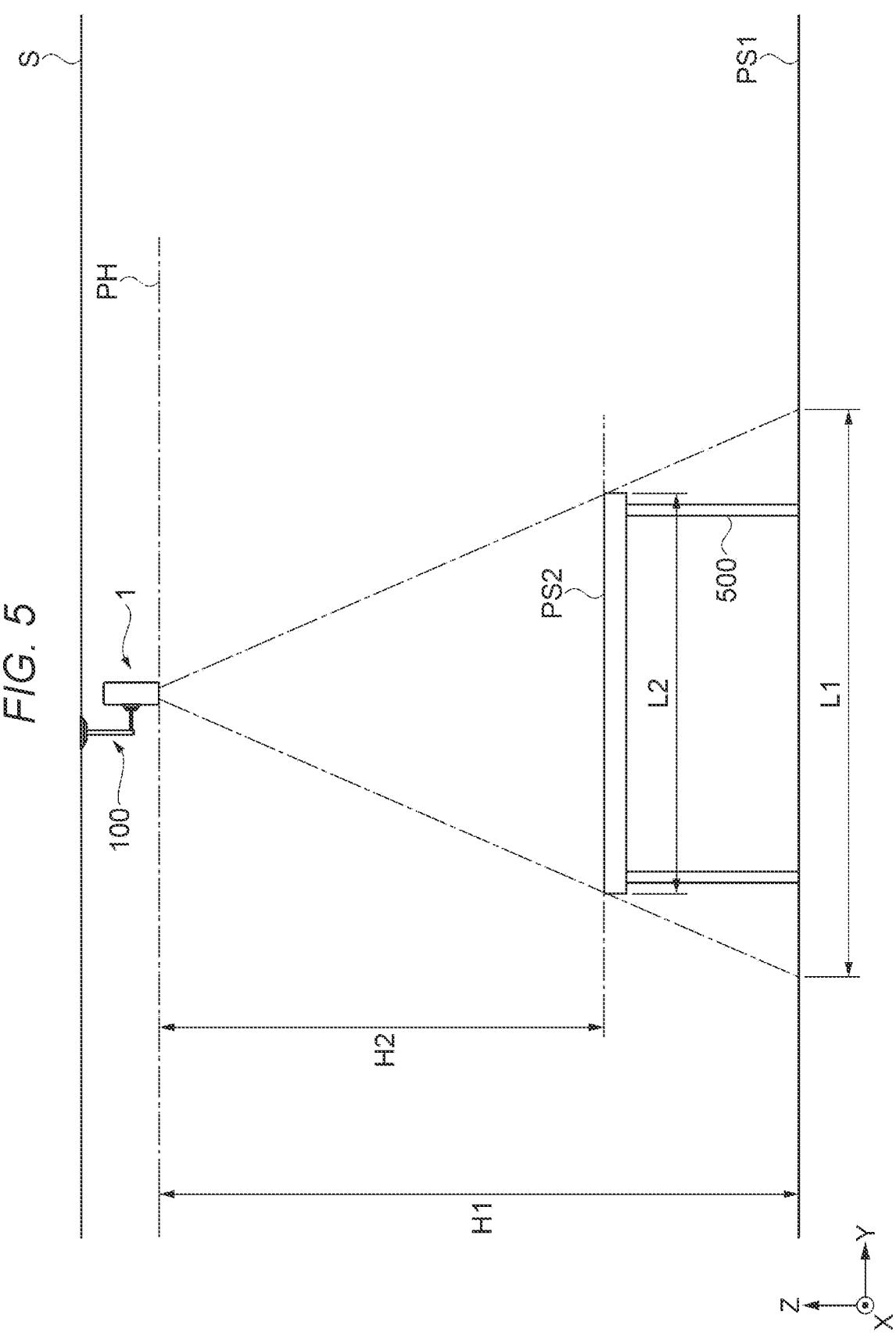
FIG. 5 is a schematic diagram of the case of installing the projector defining an upper surface of a desk as a projection surface.
Figure 6:
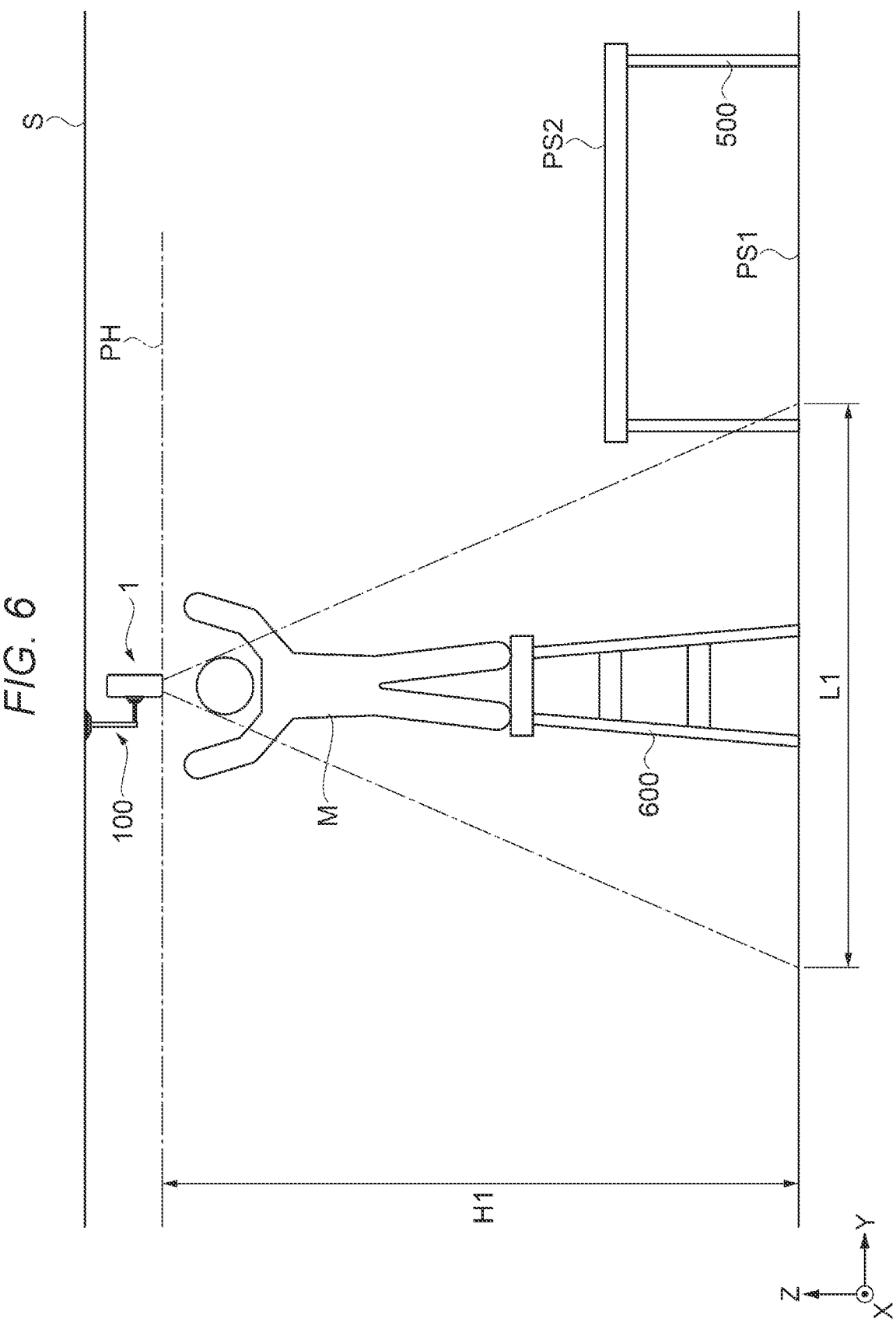
FIG. 6 is a diagram showing a state of installing the projector.

In a method of installing the projector 1 according to a first embodiment, the projector 1 is attached to a ceiling surface in accordance with a position of the desk 500 arranged on the floor surface PS1 by the installation operator M. FIG. 5 schematically shows the case of installing the projector 1 assuming the upper surface PS2 of the desk 500 as the projection surface. FIG. 6 shows a state of installing the projector 1. In the case shown in FIG. 5 and FIG. 6, the attachment surface S of the projector 1 is a ceiling surface. A direction from the ceiling surface toward the floor surface PS1 is hereinafter described as a −Z direction. A direction from the floor surface PS1 toward the ceiling surface is described as a +Z direction.

As shown in FIG. 5, a distance between the projector 1 and the floor surface PS1 is different from a distance between the projector 1 and the upper surface PS2 of the desk 500. A distance H1 between a projection position PH of the projector 1 and the floor surface PS1 is longer than a distance H2 between the projection position PH of the projector 1 and the upper surface PS2 of the desk 500. The distance H1 corresponds to an example of a first distance. The distance H2 corresponds to an example of a second distance. When the projector 1 projects an image having a width L2 with respect to an axis parallel to the Y axis on the upper surface PS2 of the desk 500, an image to be projected on the floor surface PS1 becomes an image having a width L1 with respect to the axis parallel to the Y axis. The width L1 of the image on the floor surface PS1 is longer than the width L2 of the image on the upper surface PS2 of the desk 500. The floor surface PS1 corresponds to an example of a first projection surface. The upper surface PS2 of the desk 500 corresponds to an example of a second projection surface. The image to be projected on the upper surface PS2 of the desk 500 corresponds to an example of a second image. The width L1 and the width L2 are each an example of an index representing a size.

As shown in FIG. 6, the installation operator M uses equipment 600 such as a stepladder when installing the projector 1 in a high place such as the ceiling surface. In order to use the equipment 600, the installation operator M moves the desk 500 when installing the projector 1. Since the installation operator M moves the desk 500 when installing the projector 1, it is unachievable for the installation operator M to project the image on the upper surface PS2 of the desk 500 to adjust the attachment position of the projector 1. It is possible for the installation operator M just to project the image on the floor surface PS1 to adjust the installation position of the projector 1. The installation operator M adjusts the attachment position of the ceiling mount device 100 to the ceiling surface on the equipment 600. The installation operator M attaches the fixation plate 101 to the ceiling surface to thereby fix an approximate attachment position. The installation operator M adjusts the positions of the first support plate 102 and the second support plate 108 to thereby perform a fine adjustment of the attachment position of the projector 1.

Figure 7:
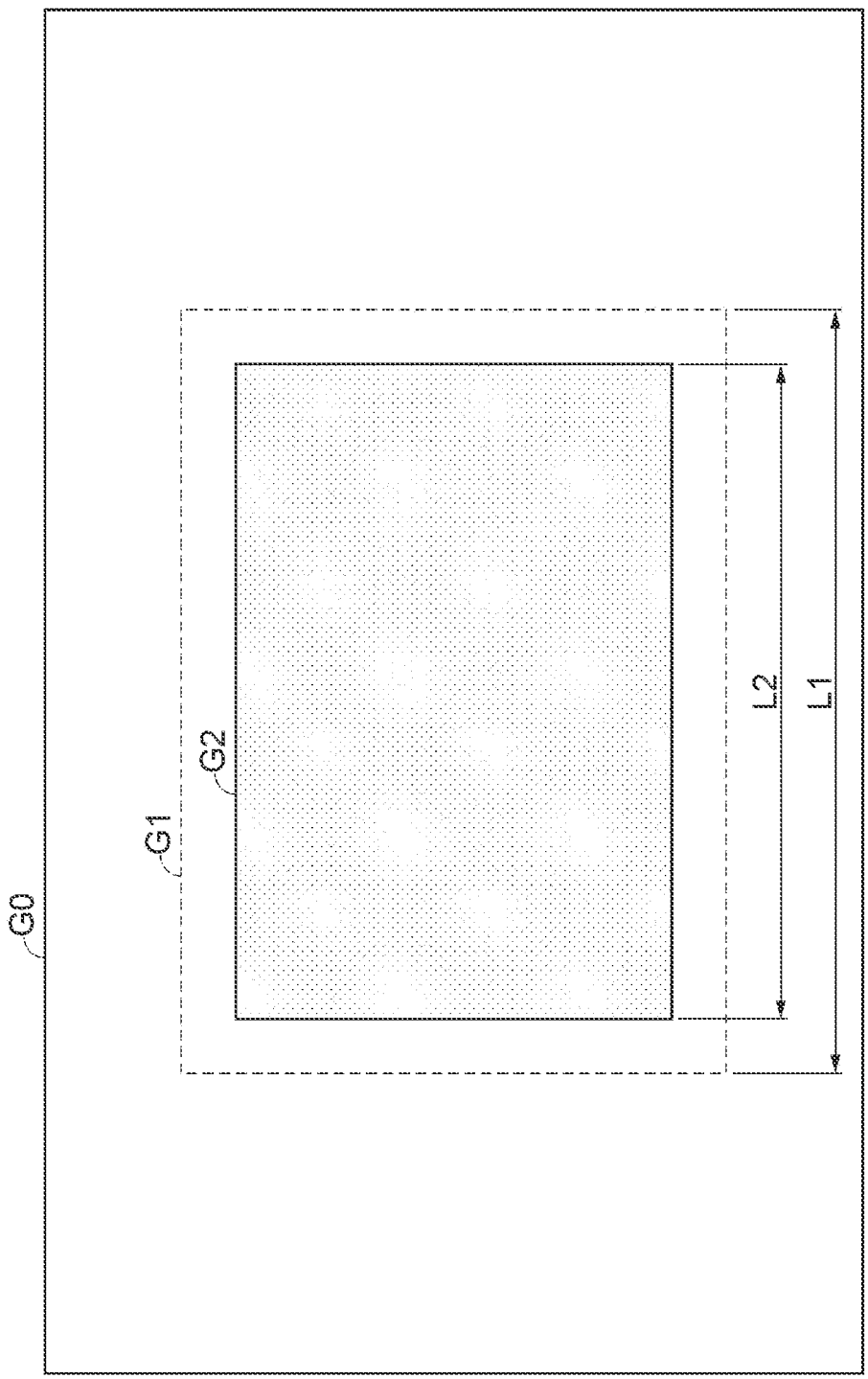
FIG. 7 is a diagram showing a general configuration of an image to be projected on a floor.

The installation operator M projects the image when adjusting the installation position of the projector 1 to the ceiling surface. FIG. 7 schematically shows the image to be projected on the floor surface PS1 in the state shown in FIG. 6. FIG. 7 shows a projectable range G0, a projection range G1, and an assumed projection range G2.

The projectable range G0 represents a maximum projectable image size when projecting the image on the floor surface PS1 using the projector 1. The projectable range G0 represents a maximum access range of light to be projected on the floor surface PS1 by the projector 1. The projectable range G0 corresponds to an example of a size of a projectable area. The size of the image represents at least one of a width along an axis parallel to the X axis and a width along an axis parallel to the Y axis.

The projection range G1 represents a range of an image to be projected on the floor surface PS1 when making the projector 1 project an image having the width L2 in a direction parallel to the Y axis on the upper surface PS2 of the desk 500. The projection range G1 becomes an image having the width L1 in the direction parallel to the Y axis. The projection range G1 shown in FIG. 7 is an imaginary area, and is not projected when installing the projector 1.

The assumed projection range G2 is a range represented by a projection image to be displayed when the installation operator M installs the projector 1 on the ceiling surface. The assumed projection range G2 represents the size of the image to be projected on the upper surface PS2 of the desk 500. The projection image corresponds to an example of a first image. The assumed projection range G2 is smaller than the projectable range G0. When the installation operator M installs the projector 1 on the ceiling surface, the projector 1 displays the projection image on the floor surface PS1. Thus, it is possible for the installation operator M to install the projector 1 at a desired attachment position while checking the size of the image projected on the upper surface PS2 of the desk 500.

The projection image is generated based on the output information 74 stored in the storage 70 shown in FIG. 3. The projection image can be an image input from the external device via the communicator 60. The projection image can be an image generated based on the image information input from the external device via the communicator 60. The projection image shown in FIG. 7 is a still image, but this is not a limitation. The projection image can be a moving image. The projection image shown in FIG. 7 has a quadrangular shape, but this is not a limitation. The projection image can arbitrarily be changed in configuration as long as the projection image is an image representing the assumed projection range G2.

It is preferable for the size of the assumed projection range G2 represented by the projection image to be a size of the maximum projectable range on the upper surface PS2 of the desk 500. The size of the assumed projection range G2 represented by the projection image is hereinafter referred to as a "size of the projection image." The display controller 84 adjusts the size of the projection image to the size of the maximum projectable range on the upper surface PS2 of the desk 500 based on, for example, the size of the upper surface PS2 of the desk 500 obtained by the acquirer 82. The size of the projection image corresponds to an example of a size of the first image. The maximum projectable range on the upper surface PS2 of the desk 500 corresponds to an example of a maximum projectable range on the second projection surface.

FIG. 8 shows an example of the projection image representing the assumed projection range G2. In FIG. 8, the assumed projection range G2 is represented by four mark images G2*b*. The mark images G2*b* correspond to an example of the projection image. The mark images G2*b* shown in FIG. 8 each constituted by two straight lines. The two mark images G2*b* located along an axis parallel to the Y axis represent the width of the assumed projection range G2 along the axis parallel to the Y axis. The two mark images G2*b* located along an axis parallel to the X axis represent the width of the assumed projection range G2 along the axis parallel to the X axis. In FIG. 8, the assumed projection range G2 is represented by the four mark images G2*b*, but this is not a limitation. The number and the shapes of the mark images G2*b* are not limited as long as the mark images G2*b* are images representing the assumed projection range G2.

As described hereinabove, in the display method of the projector 1, when the projector 1 projects the projection image on the floor surface PS1 located at the distance H1 from the projector 1, the projection image representing the size of the image to be projected on the upper surface PS2 of the desk 500 located at the distance H2 different from the distance H1 from the projector 1 is projected on the floor surface PS1.

It becomes easy for the installation operator M to figure out, on the floor surface PS1, the size of the image to be projected on the upper surface PS2 of the desk 500 different in distance from the projector 1 from the floor surface PS1.

Further, the size of the projection image is smaller than the size of the projectable range G0 as the area on the floor surface PS1 in which the projector 1 can project the projection image.

The projector 1 is capable of projecting the projection image on the floor surface PS1.

Further, the projection image can be an image input to the projector 1.

It is possible for the installation operator M to confirm the size of the image using a desired image.

Further, when the distance H2 is shorter than the distance H1, the projection image represents the maximum projectable range on the upper surface PS2 of the desk 500.

It is possible for the installation operator M to figure out the size of the largest projectable image on the upper surface PS2 of the desk 500, on the floor surface PS1 located at the distance H1.

3.1 Method of Generating Projection Image

The projection image is generated by the display controller 84 processing the output information 74 stored in the storage 70. The display controller 84 processes the output information 74 based on a variety of types of information obtained by the acquirer 82. Each of the methods of generating the projection image data for displaying the projection image will hereinafter be described. These methods can be combined with each other within a range in which the methods do not conflict with each other.

3.1.1 Generation of Projection Image Data Using Measurement Data

The installation operator M installs the desk 500 on the floor surface PS1. The installation position of the desk 500 can be an arbitrary position on the floor surface PS1. The description will be presented citing when the measurer 90 is an external depth sensor as an example. The installation operator M disposes the depth sensor above the desk 500, and in the vicinity of the ceiling surface. The installation operator M measures a first measurement distance from the depth sensor to the floor surface PS1, and a second measurement distance from the depth sensor to the upper surface PS2 of the desk 500 using the depth sensor. In the method of generating the projection image data using the distances measured, the first measurement distance corresponds to the first distance, and the second measurement distance corresponds to the second distance. The depth sensor transmits distance data including the first measurement distance and the second measurement distance thus measured to the projector 1. It should be noted that it is possible to couple the depth sensor to a computer not shown, and transmit the distance data to the projector 1 via the computer. The projector 1 receives the distance data with the communicator 60. The communicator 60 outputs the distance data thus received to the acquirer 82. The acquirer 82 outputs the distance data thus input to the display controller 84. The display controller 84 generates the projection image based on the distance data thus input.

The display controller 84 calculates the size of the projection image using the distance data. The display controller 84 calculates a ratio between the size of the image to be projected on the floor surface PS1 and the size of the image to be projected on the upper surface PS2 of the desk 500 using, for example, the first measurement distance, the second measurement distance, and the size of the image to be projected on the upper surface PS2 of the desk 500. The size of the image to be projected on the upper surface PS2 of the desk 500 can be the size of the maximum projectable range on the upper surface PS2 of the desk 500, or can also be a size designated by inputting a numerical value to the projector 1. The size of the maximum projectable range on the upper surface PS2 of the desk 500 can be obtained by measuring the upper surface PS2 of the desk 500 using the depth sensor. The display controller 84 identifies the size of the projection image using the ratio thus calculated and the first measurement distance. The display controller 84 generates the projection image data having the size thus identified, and then outputs the result to the outputter 86. The projection image data is a kind of image data. The outputter 86 outputs the projection image data to the projecting unit 50. The projecting unit 50 projects the projection image on the floor surface PS1 using the projection image data.

In the explanation described above, the depth sensor measures the first measurement distance and the second measurement distance, but this is not a limitation. When the size of the assumed projection range G2 on the floor surface PS1 has been known, it is possible for the depth sensor to measure at least one of the first measurement distance and the second measurement distance. The depth sensor transmits at least one of the first measurement distance and the second measurement distance thus measured to the projector 1. The display controller 84 identifies the size of the projection image using at least one of the first measurement distance and the second measurement distance. Specifically, there is identified the size of the range to be displayed as the assumed projection range G2 in the projection image data.

Further, the distance data can be measured by the measurer 90 incorporated in the projector 1 instead of the external depth sensor. The installation operator M attaches the projector 1 at a tentative attachment position on the ceiling surface. The installation operator M installs the desk 500 on the floor surface PS1 below the projector 1 attached to the tentative attachment position. The installation operator M measures the first measurement distance and the second measurement distance using the measurer 90 of the projector 1 attached to the tentative attachment position. The measurer 90 outputs the distance data to the acquirer 82 via the communicator 60.

As described above, in the display method of the projector 1, at least one of the first distance and the second distance is measured, and the projection image is displayed based on at least one of the first distance and the second distance.

By using the distance actually measured, it is possible for the projector 1 to display the projection image more accurate in size, and thus, more accurately decide the size of the projection image to be projected on the upper surface PS2 of the desk 500.

3.1.2 Generation of Projection Image Data Using Camera

The installation operator M provides a mark at a position on the floor surface PS1 corresponding to the assumed projection range G2. It is sufficient for the mark to be able to be moved by the installation operator M, and to be able to be recognized by analyzing an image taken by a camera. The size of the assumed projection range G2 is represented by the mark alone, or a plurality of the marks. The installation operator M installs the camera on the ceiling surface, or in the vicinity of the ceiling surface. When the measurer 90 is the camera, the installation operator M installs the projector 1 on the ceiling surface, or in the vicinity of the ceiling surface. The installation operator M detects the mark provided on the floor surface PS1 using the camera. The installation operator M outputs imaging data related to the mark detected to the acquirer 82 of the projector 1. The acquirer 82 outputs the imaging data thus obtained to the display controller 84. The display controller 84 generates the projection image data based on the imaging data. The display controller 84 identifies the size of the assumed projection range G2 in the imaging data based on the size of the mark included in the imaging data, or an arrangement of the plurality of marks. The display controller 84 generates the projection image data based on a correspondence relationship between the imaging data and the projectable range G0 on the floor surface PS1, and on the size of the assumed projection range G2 thus identified. In this method, it is not essential for the projector 1 to obtain the first distance and the second distance.

3.1.3 Generation of Projection Image Data Using CAD Data

The installation operator M obtains CAD (Computer Aided Design) data of a space for installing the projector 1. The CAD data includes the first distance from the floor surface PS1 to the ceiling surface, a height of the desk 500, and the size of the upper surface PS2. The CAD data can further include the second distance from the desk 500 to the ceiling surface. The CAD data includes a position where the projector 1 is attached. The CAD data can include dimension data of the ceiling mount device 100, and dimension data of the projector 1. The CAD data corresponds to an example of the information including at least one of the first distance and the second distance. The installation operator M transmits the CAD data thus obtained to the communicator 60 of the projector 1 using an external device such as a computer. It is possible for the installation operator M to couple a storage element such as a memory card including the CAD data to the projector 1 to make the projector 1 read the CAD data.

The acquirer 82 of the projector 1 obtains the CAD data. The acquirer 82 outputs the CAD data to the display controller 84. It is possible for the acquirer 82 to analyze the CAD data to extract data to be used when calculating the size of the projection image from the CAD data. The display controller 84 identifies the size of the projection image using the CAD data. The display controller 84 identifies the size of the projection image based on, for example, a distance from an assumed attachment position where the projector 1 is attached to the floor surface PS1, a distance from the assumed attachment position to the upper surface PS2 of the desk 500, and the dimension of the upper surface PS2 of the desk 500. The display controller 84 generates the projection image data based on the size of the projection image thus identified.

As described hereinabove, in the display method of the projector 1, input of the information including at least one of the first distance and the second distance is received, and the projection image is displayed based on at least one of the first distance and the second distance.

By using the information thus input, it is possible for the projector 1 to display the projection image more accurate in size. It is possible for the installation operator M to more accurately figure out the size of the image to be projected on the upper surface PS2 of the desk 500.

3.1.4 Generation of Projection Image Data Using User Interface

Figure 9:
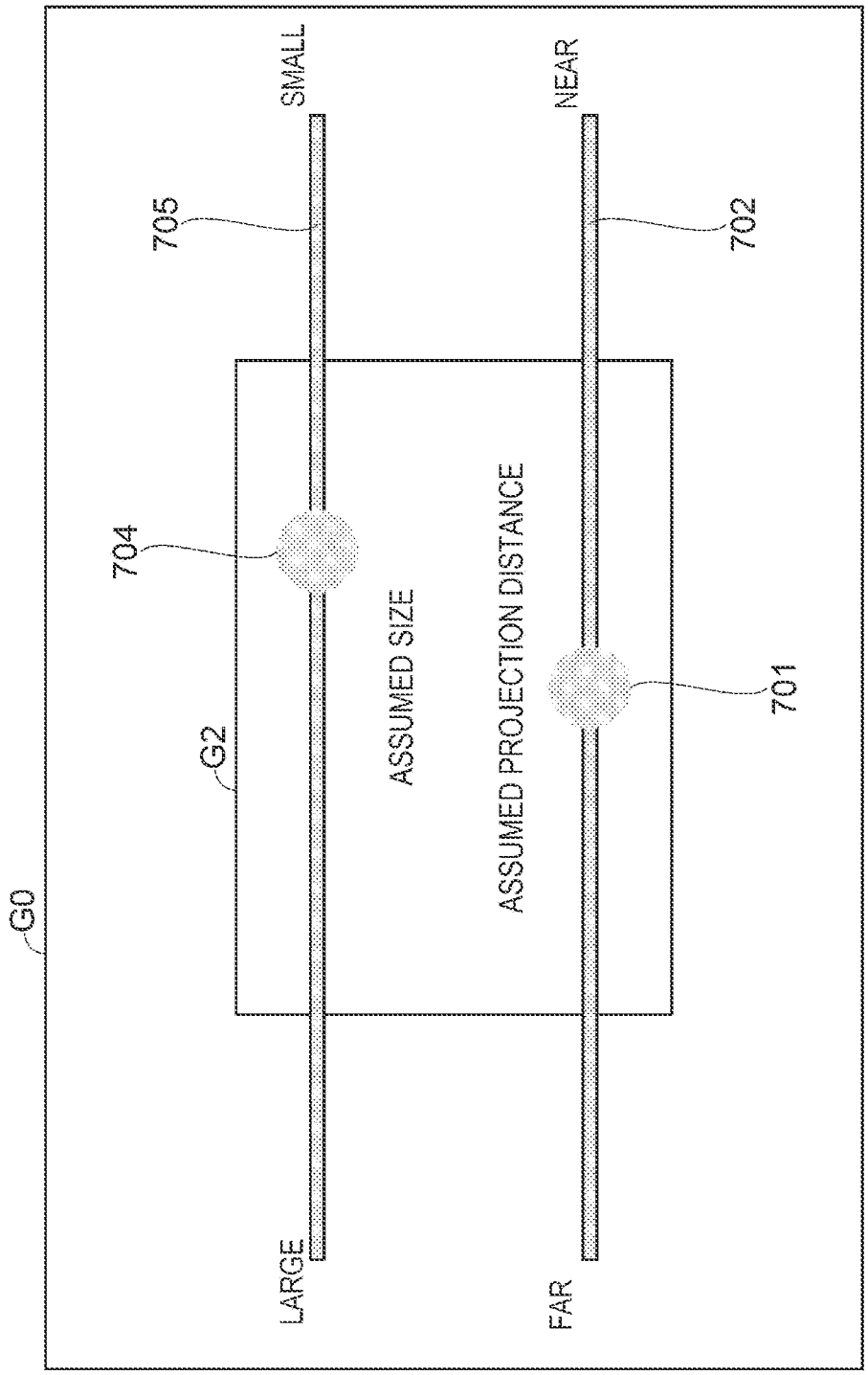
FIG. 9 is a diagram showing a user interface.

FIG. 9 shows a user interface projected in the projector 1. The user interface is hereinafter referred to as UI. The UI corresponds to an example of a reception image. The UI shown in FIG. 9 is used when, for example, the projector 1 has not obtained the distance from the floor surface PS1 to the upper surface PS2 of the desk 500 or the dimension of the upper surface PS2. The distance from the floor surface PS1 to the upper surface PS2 of the desk 500 is hereinafter referred to as an assumed projection distance. The dimension of the upper surface PS2 is referred to as an assumed size. The UI shown in FIG. 9 displays the projectable range G0, the assumed projection range G2, a first slide mark 701, a first display bar 702, a second slide mark 704, and a second display bar 705. The assumed projection range G2 is displayed by the projection image.

The first slide mark 701 displays an input result by the installation operator M to the projector 1. It is possible for the installation operator M to change the position of the first slide mark 701 by operating a remote controller or the like not shown. The first slide mark 701 moves on the first display bar 702 in accordance with the operation by the installation operator M. The position of the first slide mark 701 represents a distance setting related to the assumed projection distance. The position of the first slide mark 701 corresponds to an example of the input related to the second distance.

The first display bar 702 represents a changeable range of the assumed projection distance by the operation by the installation operator M. A right end of the first display bar 702 represents the fact that the assumed projection distance is the shortest. In other words, the right end of the first display bar 702 represents the fact that the floor surface PS1 and the upper surface PS2 of the desk 500 are the nearest to each other. A left end of the first display bar 702 represents the fact that the assumed projection distance is the longest. In other words, the left end of the first display bar 702 represents the fact that the floor surface PS1 and the upper surface PS2 of the desk 500 are the farthest from each other.

The size of the assumed projection range G2 changes in tandem with the position of the first slide mark 701. When the first slide mark 701 moves to a right side on the first display bar 702, the assumed projection range G2 becomes larger. When the first slide mark 701 moves to a left side on the first display bar 702, the assumed projection range G2 becomes smaller.

The second slide mark 704 displays the input result by the installation operator M to the projector 1. It is possible for the installation operator M to change the position of the second slide mark 704 by operating the remote controller or the like not shown. The second slide mark 704 moves on the second display bar 705 in accordance with the operation by the installation operator M. The position of the second slide mark 704 represents a size setting related to the size of the assumed projection range G2.

The second display bar 705 represents a changeable range with respect to the size of the assumed projection range G2 by the operation by the installation operator M. The second display bar 705 represents the range of the assumed projection range G2 which can be changed by the assumed projection distance set by the first slide mark 701. A right end of the second display bar 705 represents the fact that the assumed projection range G2 which can be projected by the projector 1 is the smallest. A left end of the second display bar 705 represents the fact that the assumed projection range G2 which can be projected by the projector 1 is the largest.

The size of the assumed projection range G2 changes in tandem with the position of the second slide mark 704. When the second slide mark 704 moves to a right side on the second display bar 705, the assumed projection range G2 becomes smaller. When the second slide mark 704 moves to a left side on the second display bar 705, the assumed projection range G2 becomes larger.

The installation operator M changes the position of the first slide mark 701 to change the size of the assumed projection range G2. The installation operator M changes the size of the assumed projection range G2 to decide the size of the desired projection image. It is possible for the projector 1 to generate the projection image based on the assumed projection distance input by the installation operator M. The projector 1 calculates a relative ratio between the first distance from the projector 1 to the floor surface PS1 and the second distance from the projector 1 to the upper surface PS2 of the desk 500 based on the position of the first slide mark 701. Here, the distance to the upper surface PS2 of the desk 500 is an assumed distance when the desk 500 is disposed on the floor surface PS1. The projector 1 generates the projection image based on the relative ratio between the first distance and the second distance, and an initial value in the UI of the assumed projection range G2.

It is possible for the installation operator M to change the position of the second slide mark 704 to change the size of the assumed projection range G2. It is possible for the installation operator M to change the position of the first slide mark 701 and the position of the second slide mark 704 to decide the size of the projection image.

In the display method of the projector 1, the UI for receiving the input related to the distance from the projector 1 to the upper surface PS2 of the desk 500 is displayed, and the size of the projection image is changed based on the input related to the distance from the projector 1 to the upper surface PS2 of the desk 500 received via the UI.

It becomes easy for the installation operator M to figure out the size of the image when the distance from the projector 1 to the upper surface PS2 of the desk 500 is different.

As described hereinabove, in the display method of the projector 1, the projection image is displayed based on at least one of the first distance and the second distance.

It becomes easy for the installation operator M to figure out the attachment position of the projector 1 by checking the size of the projection image to be projected at the position different from the upper surface PS2 of the desk 500.

3.2 Method of Displaying Projection Image

Figure 10:
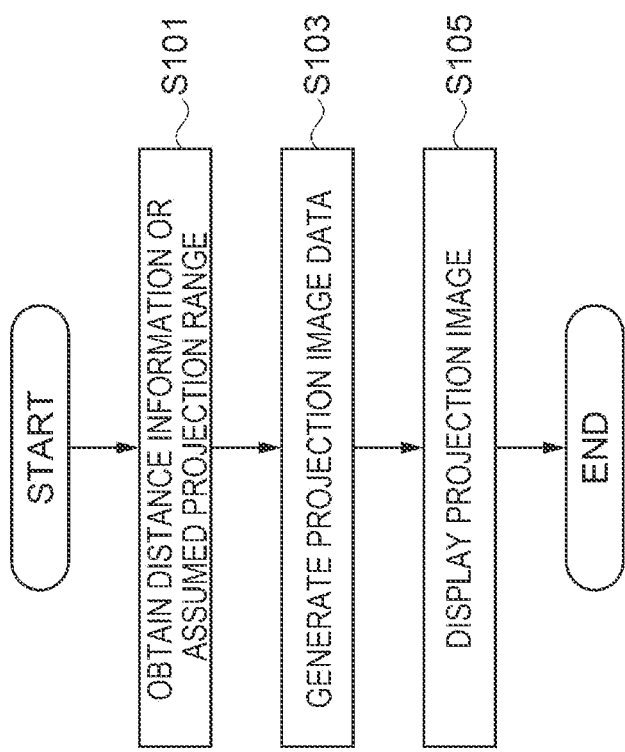
FIG. 10 is a diagram showing a flowchart of displaying the projection image.

FIG. 10 shows a flowchart when displaying the projection image. FIG. 10 shows the flow in which the projector 1 performs the display when the installation operator M installs the projector 1.

In the step S101, the projector 1 obtains the distance information or the assumed projection range G2. The distance information is at least one of the first distance and the second distance. As described above, the distance information is obtained by the measurement by the depth sensor or the like, an imaging result by the camera, or the CAD data. The assumed projection range G2 is obtained using the user interface.

After the projector 1 obtains the distance information or the assumed projection range G2, the projector 1 generates the projection image data in the step S103. The projection image data is generated by the method described above using the distance information or the assumed projection range G2 thus obtained. In the projection image data, the size of the projection image is identified.

After the projector 1 generates the projection image data, the projector 1 displays the projection image based on the projection image data on the floor surface PS1 in the step S105. It is possible for the installation operator M to figure out the size of the image to be projected on the upper surface PS2 of the desk 500 by checking the projection image displayed on the floor surface PS1.

4. Method of Installing Projector 1 According to Second Embodiment

Figure 11:
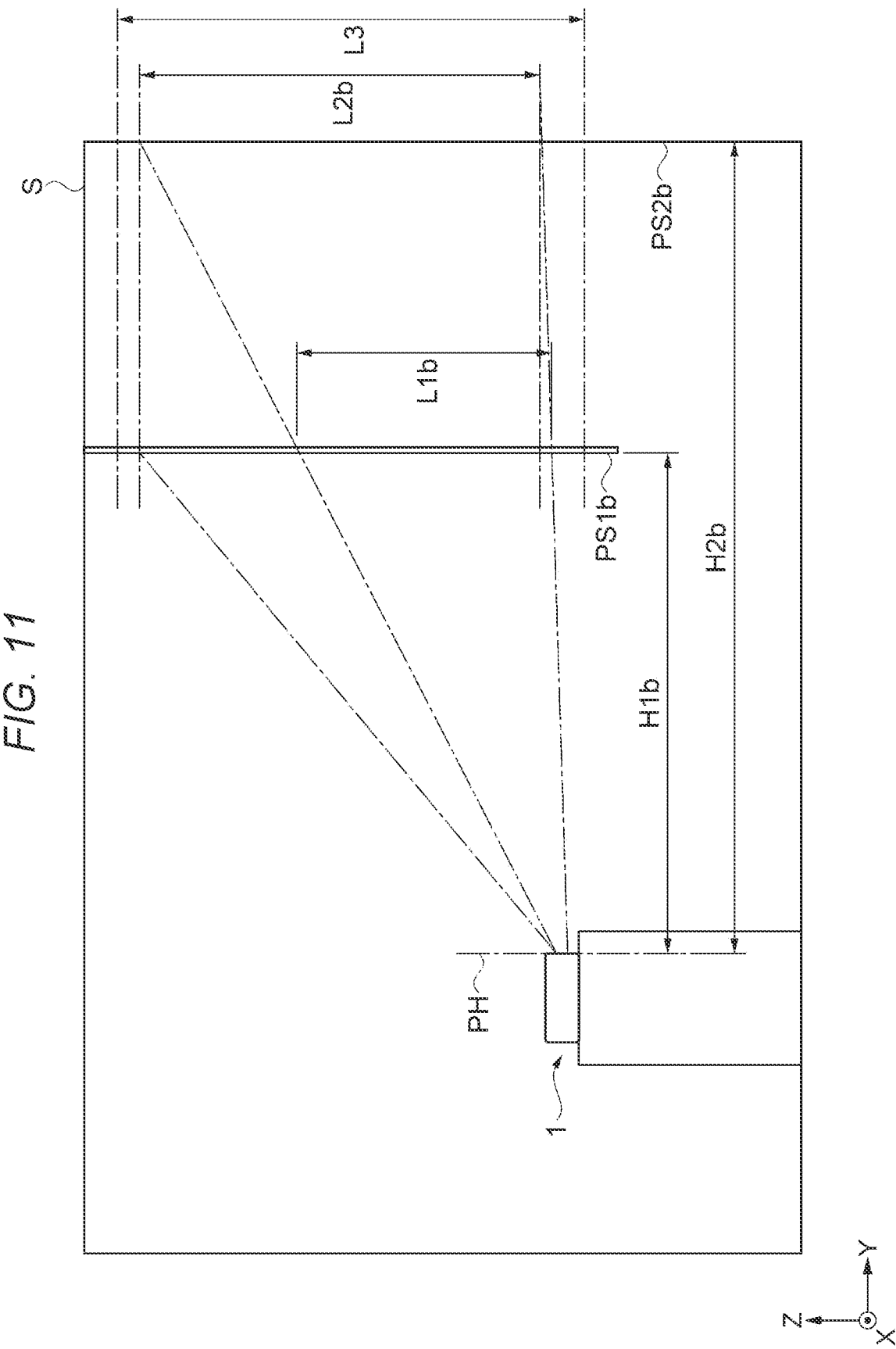
FIG. 11 is a schematic diagram of the case of installing the projector defining a wall surface as the projection surface.

Hereinafter, when the same constituents as in the first embodiment are used in the second embodiment, the same constituents are denoted by the same reference symbols in the description. In the method of installing the projector 1 as the second embodiment, the projector 1 is installed by the installation operator M at a position where the projection is performed on a wall surface PS2*b*. In the second embodiment, it is assumed when it is unachievable for the projector 1 to perform the projection directly on the wall surface PS2*b* when the installation operator M installs the projector 1. The installation operator M installs a temporary screen PS1*b* between the projector 1 and the wall surface PS2*b*. The installation operator M projects the image on the temporary screen PS1*b* to decide the installation position of the projector 1. FIG. 11 schematically shows the case of installing the projector 1 assuming the wall surface PS2*b* as the projection surface. FIG. 11 shows a situation in which the temporary screen PS1*b* is installed. The temporary screen PS1*b* corresponds to an example of the first projection surface. The wall surface PS2*b* corresponds to an example of the second projection surface. A direction from the projector 1 toward the wall surface PS2*b* is described as a +Y direction. A direction from the wall surface PS2*b* toward the projector 1 is described as a −Y direction. Further, in FIG. 11, the size of the projectable area of the temporary screen PS1*b* is described as a width L3. The width L3 is a width with respect to an axis parallel to the Z axis. The size of the projectable area of the temporary screen PS1*b* corresponds to an example of the size of the projectable area as an area on the first projection surface.

As shown in FIG. 11, a distance between the projector 1 and the temporary screen PS1*b* is different from a distance between the projector 1 and the wall surface PS2*b*. A distance H1*b* between the projection position PH of the projector 1 and the temporary screen PS1*b* is shorter than a distance H2*b* between the projection position PH of the projector 1 and the wall surface PS2*b*. The distance H1*b* corresponds to an example of the first distance. The distance H2*b* corresponds to an example of the second distance. When the projector 1 projects an image having a width L2*b* with respect to an axis parallel to the Z axis on the wall surface PS2*b*, an image to be projected on the temporary screen PS1*b* becomes an image having a width L1*b* with respect to the axis parallel to the Z axis. The width L1*b* of the image on the temporary screen PS1*b* is shorter than the width L2*b* of the image on the wall surface PS2*b*. The image to be projected on the wall surface PS2*b* corresponds to an example of the second image.

When installing the projector 1, the installation operator M projects the projection image having the width L2*b* with respect to the axis parallel to the Z axis on the temporary screen PS1*b*. The projection image to be projected on the temporary screen PS1*b* is, for example, the projection image as the assumed projection range G2 shown in FIG. 7. The installation operator M adjusts the installation position of the projector 1 while checking the projection image projected on the temporary screen PS1*b*.

For example, the installation operator M installs the projector 1 at a tentative installation position. Further, the installation operator M installs the temporary screen PS1*b* between the projector 1 and the wall surface PS2*b*. The installation operator M measures the size of the projectable area of the temporary screen PS1*b* using the measurer 90 of the projector 1. The display controller 84 stores the size of the projectable area thus measured. The projector 1 generates the projection image having the width L2*b* with respect to the axis parallel to the Z axis on the temporary screen PS1*b* based on the output information 74. The display controller 84 compares the size of the projection image thus generated and the size of the projectable area thus stored with each other. When the display controller 84 has determined that the size of the projection image thus generated is equal to or smaller than the size of the projectable area on the temporary screen PS1*b*, the projector 1 projects the projection image with the projecting unit 50. When the display controller 84 has determined that the size of the projection image thus generated is larger than the size of the projectable area on the temporary screen PS1*b*, the display controller 84 makes the projecting unit 50 project a message. The message includes a content that it is unachievable to display the projection image on the temporary screen PS1*b*. The message corresponds to an example of a notification representing that it is unachievable to display the first image. In the generation of the projection image data for displaying the projection image, it is possible to arbitrarily use any one of the methods described in the first embodiment.

It is possible for the display controller 84 to adjust the size of the projection image based on the size of the projectable area of the temporary screen PS1*b* stored. The display controller 84 makes the size of the projection image smaller than the size of the projectable area of the temporary screen PS1*b*.

As described hereinabove, in the display method of the projector 1, the size of the projection image is smaller than the size of the projectable area as the area of the temporary screen PS1*b* for the projector 1 to be able to project the projection image.

The projector 1 is capable of projecting the projection image on the temporary screen PS1*b*. It is possible for the installation operator M to figure out the size of the image to be projected on the wall surface PS2*b* by checking the projection image projected on the temporary screen PS1*b*.

Further, in the display method of the projector 1, when the size of the projection image is larger than the size of the projectable area as the area of the temporary screen PS1*b* for the projector 1 to be able to project the projection image, the projector 1 displays the notification representing that it is unachievable to display the projection image, on the temporary screen PS1*b*.

The installation operator M understands that the projection image representing the size of the image to be projected on the wall surface PS2*b* cannot be duplicated on the temporary screen PS1*b* by the projector 1.

What is claimed is:

1. A display method comprising:
   projecting, by a projector on a first projection surface located at a first distance from the projector, a first image which represents a size of a second image to be projected on a second projection surface by the projector, the second projection surface being located at a second distance, different from the first distance, from the projector.

2. The display method according to claim 1, wherein the projector displays the first image based on at least one of the first distance and the second distance.

3. The display method according to claim 2, wherein the projector measures the at least one of the first distance and the second distance.

4. The display method according to claim 2, wherein the projector receives input of information including the at least one of the first distance and the second distance.

5. The display method according to claim 1, wherein the projector displays a reception image for receiving input related to the second distance, and
   the projector changes a size of the first image based on the input related to the second distance received via the reception image.

6. The display method according to claim 1, wherein a size of the first image is smaller than a size of a projectable area in which the projector is capable of projecting the first image in a largest size on the first projection surface.

7. The display method according to claim 1, wherein when a size of the first image is larger than a size of a projectable area in which the projector is capable of projecting the first image in a largest size on the first projection surface, displaying, by the projector, a notification representing that it is unachievable to display the first image is displayed on the first projection surface.

8. The display method according to claim 1, wherein the first image is an image input to the projector.

9. The display method according to claim 1, wherein when the second distance is shorter than the first distance, the first image represents a maximum projectable range on the second projection surface.

\* \* \* \* \*